United States Patent [19]

Ishizeki et al.

[11] Patent Number: 4,934,497
[45] Date of Patent: Jun. 19, 1990

[54] POWER TRANSMISSION CONTROL SYSTEM FOR AN ANTI-SKID BRAKE SYSTEM

[75] Inventors: Seiichi Ishizeki; Katsumasa Igarashi, both of Tokyo, Japan

[73] Assignee: Fuji Jukogyo Kabushiki Kaisha, Tokyo, Japan

[21] Appl. No.: 270,678

[22] Filed: Nov. 14, 1988

[30] Foreign Application Priority Data

Nov. 24, 1987 [JP] Japan ................... 62-295879

[51] Int. Cl.$^5$ ............................................. B60K 41/24
[52] U.S. Cl. ................................. 192/13 R; 303/97; 180/233; 192/4 A
[58] Field of Search ............ 192/13 R, 0.055, 0.044, 192/4 A; 180/233; 303/96, 109, 111, 97, 99; 364/426.02

[56] References Cited

U.S. PATENT DOCUMENTS

| | | | |
|---|---|---|---|
| 3,610,362 | 10/1971 | Toyama | 192/13 R |
| 4,491,919 | 1/1985 | Leiber | 364/426.02 |
| 4,676,353 | 6/1987 | Matsuda | 192/3.31 |
| 4,770,266 | 9/1988 | Yamaguchi et al. | 180/233 |

FOREIGN PATENT DOCUMENTS 60-61354 4/1985 Japan.

*Primary Examiner*—Leslie A. Braun
*Assistant Examiner*—David A. Testardi
*Attorney, Agent, or Firm*—Martin A. Farber

[57] ABSTRACT

A clutch is provided for transmitting power of an engine to either of the front or rear wheels of a motor vehicle. A brake switch is provided to be closed by depressing a brake pedal of the vehicle to produce a brake pedal, and a detector is provided for detecting operation of an anti-skid brake system and for producing an anti-skid signal. In response to the brake signal and to the anti-skid signal, the clutch is disengaged, thereby reducing engine braking effect.

5 Claims, 4 Drawing Sheets

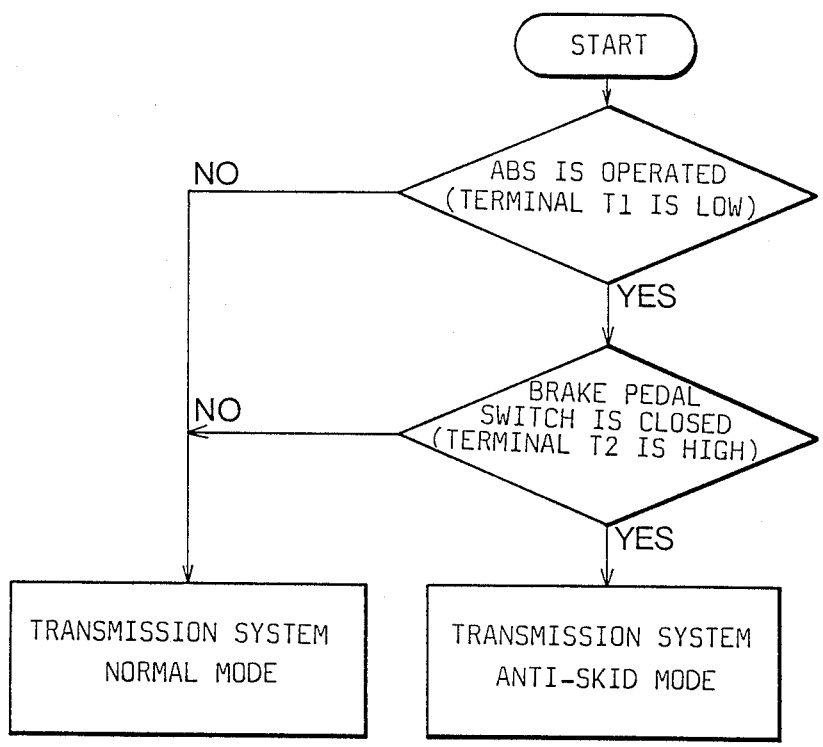

POWER TRANSMISSION CONTROL SYSTEM FOR AN ANTI-SKID BRAKE SYSTEM

BACKGROUND OF THE INVENTION

The present invention relates to a hydraulic anti-skid brake system of a motor vehicle, and more particularly to a system for controlling the power train of the vehicle, when the anti-skid brake system (ABS) is in operation.

The anti-skid brake system is installed on a brake system for wheels of the vehicle. The anti-skid brake system is provided for preventing the wheels from completely locking, and hence from skidding during rapid braking or by braking on slippery surfaces such as snowy roads, thereby ensuring directional stability and steering control of the vehicle during the braking operation and improving safety of the vehicle. For example, Japanese Patent Laid Open 60-61354 discloses an anti-skid brake system where an anti-skid control unit is operated to stop a supply of brake fluid to cylinders of the wheels so as to reduce the brake fluid pressure in dependency on speed reduction rate of the wheels and on relative reduction rate of the wheels to that of the vehicle speed. When the wheel speed is increased by the reaction from the road surface to approach the vehicle speed, the brake fluid is then again supplied to the cylinders to increase the pressure. The operation is repeated so as to effectively brake the vehicle without locking the wheels.

However, on a road having little reaction or a small friction coefficient, the wheels are easily locked with a slight braking pressure. Although the anti-skid brake system is operated to reduce the fluid pressure in the cylinders, since the reaction of the road surface is small, it requires a long time for the wheels to recover their speed. Moreover, although a minimum pressure is applied after the wheel speed is recovered, braking effect is too large for the road surface to cause an excessive slipping rate which results in unstable steering of the vehicle. Such a phenomenon is aggravated when engine braking is effected on the vehicle body.

If the engine braking is effected in the anti-skid operation, the engine braking force is exerted on the wheels to lock them in spite of the anti-skid operation. Since the anti-skid brake system operates to reduce the fluid pressure in the system in accordance with the deceleration of the wheel speed, if the wheel speed is disturbed by the engine braking, the efficiency of the anti-skid brake system is reduced. Thus, it is desired to eliminate the disturbance due to the operation of the engine braking, for providing a proper anti-skid brake system control.

In order to eliminate the disturbances, there has been proposed a system where a transmission control unit is provided in the anti-skid brake system to disconnect a clutch provided in the power train between a transmission of the vehicle and the wheels. Namely the power transmitting system from the engine to the wheels is disconnected when the anti-skid brake system is operated. The disconnection of the transmitting system, where the engine braking does not act, continues as long as the anti-skid brake system operates. However, exclusive terminals for operating the transmission control unit must be provided on the anti-skid control unit. Accordingly, a conventional anti-skid brake system can not be used.

SUMMARY OF THE INVENTION

The object of the present invention is to provide a system for controlling a clutch for transmitting engine power to vehicle wheels when the anti-skid brake system is operated, without providing exclusive terminals on an anti-skid control unit.

According to the present invention, there is provided a power transmission control system for a motor vehicle having an anti-skid brake system, the vehicle having a clutch for transmitting power of an engine to either of front or rear wheels, the system comprising a brake switch closed by depressing a brake pedal of the vehicle to produce a brake signal, detector means for detecting operation of the anti-skid brake system and for producing an anti-skid signal, and releasing means responsive to the brake signal and to the anti-skid signal for releasing the clutch to eliminate a disturbance of the vehicle speed due to the operation of the engine braking so as to provide a proper anti-skid brake system control.

The other objects and features of this invention will become understood from the following description with reference to the accompanying drawings.

BRIEF DESCRIPTION OF DRAWINGS

FIG. 4 is a flow chart showing the operation of the system.

DETAILED DESCRIPTION OF THE PREFERRED EMBODIMENT

Figure 1:
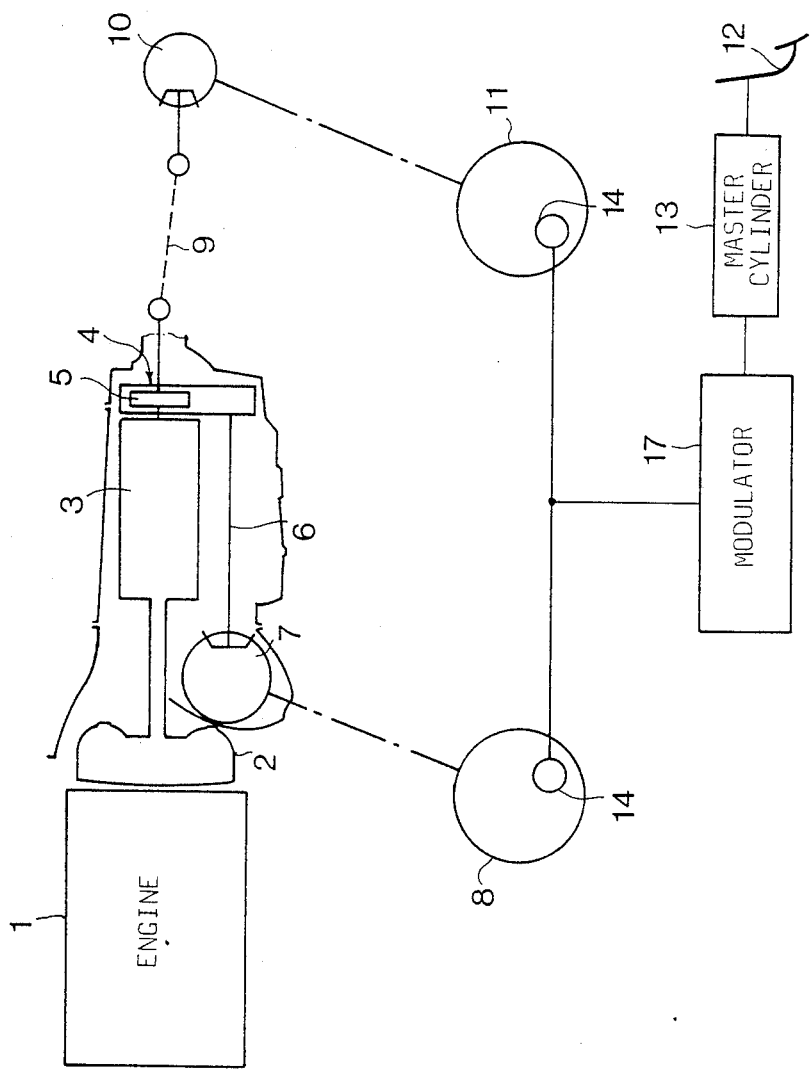
FIG. 1 is a schematic diagram showing a power transmission system of a four-wheel drive vehicle to which the present invention is applied.
Figure 3:
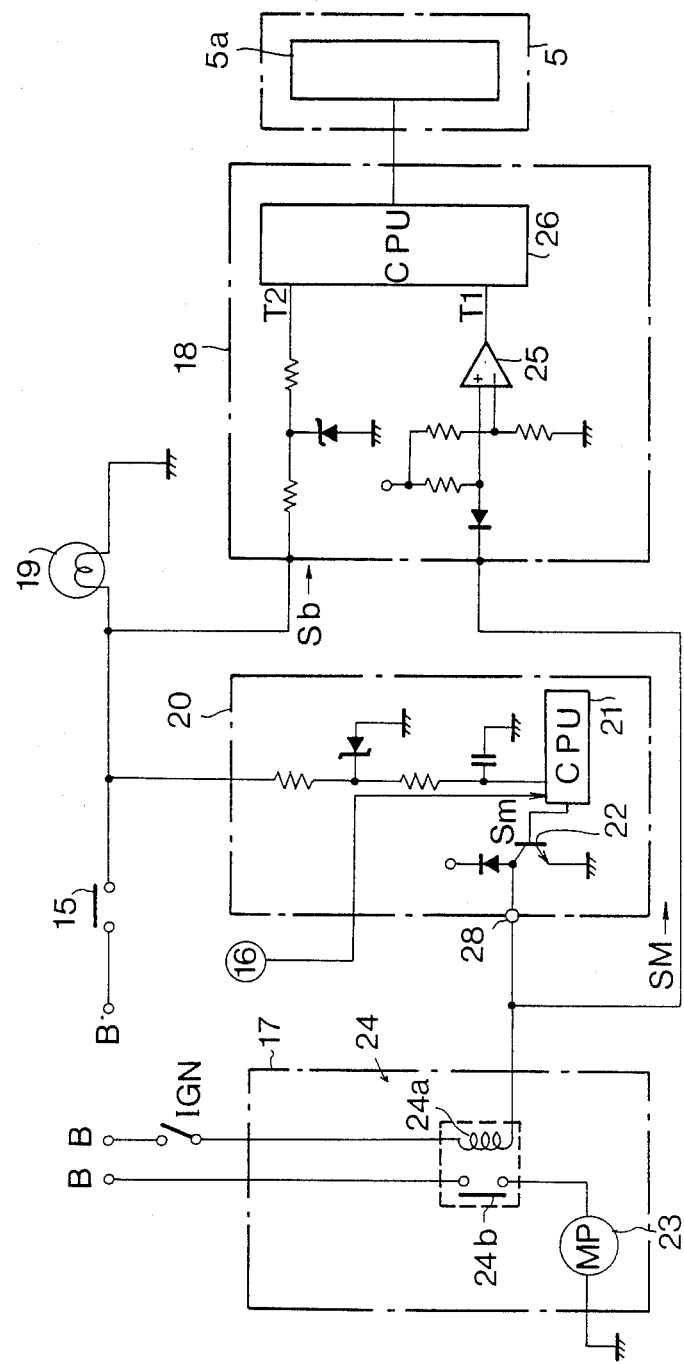
FIG. 3 shows an electric circuit in the brake system.

Referring to FIG. 1 showing a power transmission system for a four-wheel drive vehicle, an internal combustion engine 1 is mounted on a front portion of the vehicle. The engine 1 is operatively connected with an automatic transmission 3 through a torque converter 2. The automatic transmission 3 is further connected to a transfer device 4 comprising a multiple-disk transfer clutch 5 operated by a solenoid valve 5a (FIG. 3). The output of the automatic transmission 3 is transmitted to a front drive shaft 6, through the transfer device 4. The front drive shaft 6 is connected with front wheels 8 through a front differential 7. The output of automatic transmission 3 is further transmitted to a rear drive shaft 9 through the multiple-disk transfer clutch 5 and a rear differential 10 so as to drive rear wheels 11.

Figure 2:
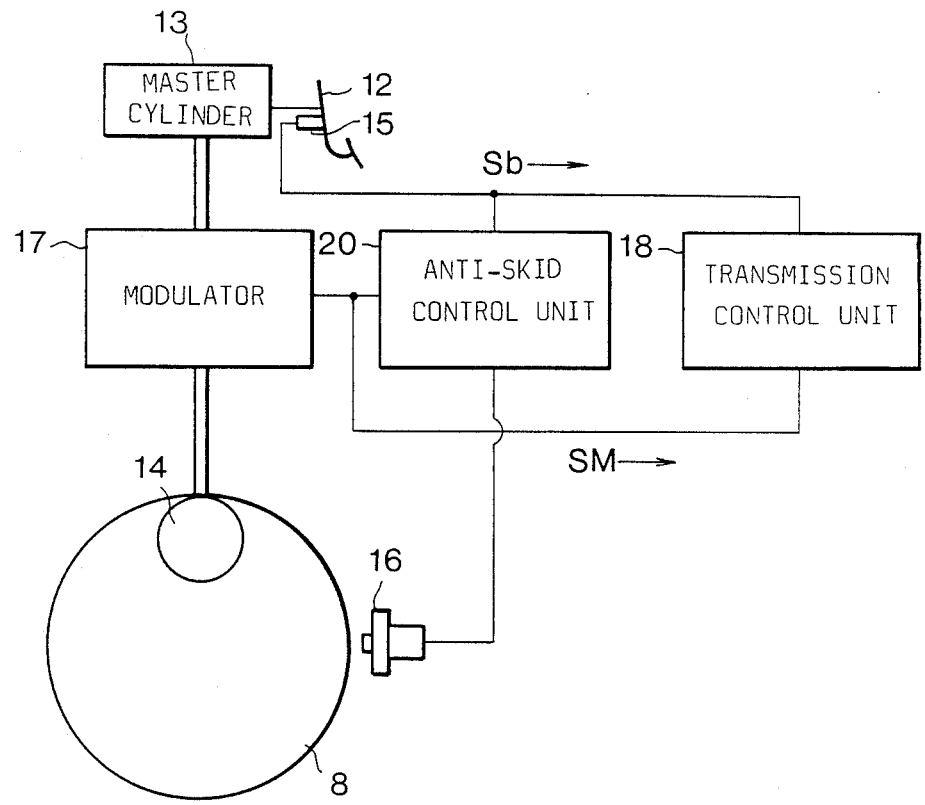
FIG. 2 is a schematic block diagram showing a brake system according to the present invention.

Referring to FIG. 2 showing a brake system for the front and rear wheels having an anti-skid brake system as an electronic brake control system, a brake pedal 12 is connected to a master cylinder 13 for producing a fluid pressure in accordance with the depression of the brake pedal 12. The master cylinder 13 is communicated with a modulator 17 of the anti-skid brake system. The modulator 17 is communicated with brake devices 14 of the wheels 8 and 11 (only one of the wheels is shown in FIG. 2). A wheel speed sensor 16 is provided adjacent each wheel and produces a wheel speed signal which is applied to an anti-skid control unit 20 of the anti-skid brake system. An output signal of the control unit 20 is applied to the modulator 17. The modulator 17 has a motor pump 23 (FIG. 3) and various valves (not shown) for reducing and for increasing and holding the pressure, so as to control the brake fluid pressure when the anti-skid brake system is in operation. The system further has a normally open brake pedal switch 15 which is closed by depressing the brake pedal 12 and connected to the control unit 20. A transmission control unit 18 is provided in the system for applying a duty ratio signal to the solenoid valve 5a to disengage the transfer clutch 5.

Referring to FIG. 3 showing an electric circuit for the brake system, the anti-skid control unit 20 comprises a CPU (central processing unit) 21 which is applied with signals from the brake pedal switch 15 and the wheel speed sensor 16 representing the wheel speed.

The CPU 21 is connected to a base of a transistor 22, an emitter of which is grounded. A collector of the transistor 22 is connected through a terminal 28 with a relay coil 24a of a relay 24 provided in the modulator 17. The coil 24a is connected to a power source B through an ignition switch IGN. The CPU 21 produces an output signal Sm which is fed to the base of the transistor 22 to render it conductive. Thus, the coil 24a is energized to close a contact 24b, thereby connecting the motor pump 23 with power source B. The terminal 28 is further connected to one of a pair of input terminals of a comparator 25 in the transmission control unit 18. The other input terminal of the comparator 25 is applied with a reference voltage. An output of the comparator 25 is applied to an input terminal T1 of a CPU 26. When the input terminal T1 is at a low level, the coil 24a is energized to close the contact 24b so as to operate the motor pump 23. This means that the anti-skid brake system is in operation. Another input terminal T2 of the CPU 26 is applied with a brake signal Sb from the brake pedal switch 15. When the brake pedal 12 is depressed to close the brake pedal switch 15, the input terminal T2 is at a high level. The CPU 26 produces a duty signal to the solenoid valve 5a of the transfer clutch 5 when terminal T1 is at the low level and terminal T2 is at the high level. A stop lamp 19 is further provided in the circuit so as to be turned on when the brake pedal switch 15 is closed.

When the brake pedal 12 is depressed, the master cylinder 13 produces the brake fluid pressure which is supplied to the brake device 14 to brake the wheels 8 and 11. When the reduction rate of the wheel speed by the braking exceeds a predetermined value, the CPU 21 of the anti-skid control unit 20 produces a high level output Sm to render the transistor 22 conductive. Accordingly, relay coil 24a is excited, thereby closing the contact 24b of the relay 24. Thus, the motor pump 23 is driven to operate the anti-skid brake system so as to maintain and to reduce the fluid pressure in the brake device 14. Accordingly, the wheel speed reduction rate decreases and increases alternately until the wheel speed approaches the vehicle speed. Thereafter, the pressure to brake the wheels is increased. By repeating the operation, the locking of the wheels can be prevented.

Even though brake pedal 12 is released, the anti-skid brake system may be operated when the wheel speed does not approach the vehicle speed.

While the transistor 22 is conductive, the terminal 28 is at the low level, so that a low level signal SM is applied to the terminal of the comparator 25. The level of the other input terminal of the comparator 25 is at a high level. Thus, the comparator 25 applies a low level output signal to the terminal T1 of the CPU 26. On the other hand, when the brake pedal 12 is depressed to close the brake pedal switch 15, the high level output signal is applied to the other terminal T2. Accordingly, the CPU 26 produces a duty ratio signal which is applied to the solenoid valve 5a to disengage the clutch 5. Thus, the rear drive shaft 9 is disconnected from the transmission 3, thereby reducing the engine braking effect on the vehicle body. Therefore, the anti-skid brake system is sufficiently operated without being affected by the engine brake.

Referring to FIG. 4 describing the operation for cutting the transmission of power to the rear wheels, it is determined whether the anti-skid brake system is operating depending on the level of the signal SM. When the anti-skid brake system is operated, that is when the level of terminal T1 is at a low level, it is further determined whether the brake pedal switch 15 is closed. When the brake switch is closed, that is when the terminal T2 has a high potential, the power transmission system is in an anti-skid brake mode, namely the transfer clutch 5 is disengaged.

The present invention may be applied to a four-wheel drive vehicle having a transfer clutch, the capacity of which is changeable. In such a transmission system, the distribution ratio to the rear wheels is decreased instead of entirely cutting off the transmission in the anti-skid brake mode. The present invention may be further modified so as to be applied to a vehicle having an automatic transmission with an auxiliary speed range.

From the foregoing, it will be understood that the present invention provides a system applied to an anti-skid brake system for preventing the locking of the wheels on roads having a low friction coefficient while the anti-skid system is working. The system can be realized by a slight modification of the conventional anti-skid system without providing exclusive terminals.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. In a power transmission control system for a motor vehicle having an anti-skid brake system and a transfer device for directly transmitting an output of a transmission to one of front and rear wheels of the vehicle and for selectively transmitting the output of the transmission to the other of the front and rear wheels through a transfer clutch, the anti-skid brake system having a wheel speed sensing means for producing a wheel speed signal, control means responsive to the wheel speed signal for determining an anti-skid brake mode for producing a control signal, and modulator means responsive to the control signal for controlling brake fluid pressure powered by a motor pump to actuate a wheel brake, the improvement in the power transmission control system wherein:

said control means being responsive to the wheel speed signal for producing an anti-skid motor pump operating signal to actuate the pump during the anti-skid brake mode determined by said control means, a brake switch provided to produce a brake signal upon depressing a brake pedal of the vehicle, and releasing means responsive to the brake signal and to the anti-skid motor pump operating signal for releasing the transfer clutch to eliminate disturbances of vehicle speed due to an operation of engine braking, thereby providing a simple construction for the power transmission control system.

2. The control system according to claim 1, wherein said clutch has a changable capacity, and wherein said releasing of the transfer clutch is a partial releasing of the clutch which decreases distribution ratio of said clutch to said rear wheels.

3. A power transmission control system for a motor vehicle having an anti-skid brake system having a motor pump for changing pressure of oil in the anti-skid brake system and a relay for operating the pump, the vehicle having a clutch for transmitting the power of an engine to one of either front or rear wheels of the vehicle, the power of the engine also being transmitted to the other of the front or rear wheels not through the clutch, the control system comprising:
- a brake switch closed by depressing a brake pedal of the vehicle to produce a brake signal;
- wheel speed sensor means for producing a wheel speed signal;
- an anti-skid control unit including means responsive to the wheel speed signal for producing an anti-skid motor pump operating signal when reduction rate of the wheel speed exceeds a predetermined value;
- said anti-skid control unit having a terminal which is connected to the relay, for applying the anti-skid motor pump operating signal for operating the pump; and
- releasing means connected to said terminal and to the brake switch for releasing the clutch in response to the brake signal and to the anti-skid motor pump operating signal, thereby eliminating disturbance of vehicle speed due to operation of engine braking so as to provide proper anti-skid brake system control.

4. The control system according to claim 3, wherein said releasing means includes a comparator having one input connected to said terminal and another input connected to a predetermined reference value, and means connected to an output of said comparator and to the brake switch for releasing the clutch.

5. The control system according to claim 3, wherein said clutch has a changable capacity, and wherein said releasing of the clutch is a partial releasing of the clutch which decreases distribution ratio of said clutch of said rear wheels.

* * * * *